United States Patent

[11] 3,624,080

| [72] | Inventors | Peter Dimroth<br>Ludwigshafen;<br>Manfred Gaeng, Roxheim, both of<br>Germany |
|---|---|---|
| [21] | Appl. No. | 814,194 |
| [22] | Filed | Apr. 7, 1969 |
| [45] | Patented | Nov. 30, 1971 |
| [73] | Assignee | Badische Anilin- & Soda-Fabrik<br>Aktiengesellschaft<br>Ludwigshafen/Rhine, Germany |
| [32] | Priority | Apr. 5, 1968 |
| [33] | | Germany |
| [31] | | P 17 69 114.4 |

[54] DI-BENZO THIAZINO PYRROLES
3 Claims, No Drawings

[52] U.S. Cl. ..................................................... 260/243 R,
260/326.5 FM, 8/4, 8/5, 8/162 R, 8/162 B, 106/22, 106/193 D

[51] Int. Cl. .......................................................... C07d 93/12
[50] Field of Search .............................................. 260/243, 243 AN, 243 R

[56] References Cited
UNITED STATES PATENTS

| 2,989,529 | 6/1961 | Schuler et al. ................. | 260/243 |
|---|---|---|---|
| 3,299,057 | 1/1967 | Gross et al. .................... | 260/243 |

Primary Examiner—John M. Ford
Attorney—Johnston, Root, O'Keeffe, Keil, Thompson & Shurtleff ABSTRACT: New heterocyclic compounds of the di-benzothiazino[2,3-*b*:3′,2′*d*]-pyrrole series which are suitable as pigment dyes.

DI-BENZO THIAZINO PYRROLES

This invention relates to new heterocyclic compounds of the dibenzothiazino-[2,3–b:3',2'd]-pyrrole series which are suitable as pigment dyes.

The new dies have the general formula

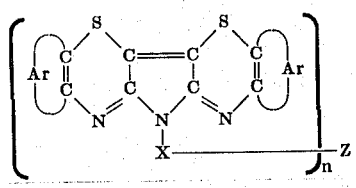

where X is a single bond or one of the bridging members — NH—, —N, —NH—OC— and

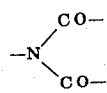

Z is an aliphatic, araliphatic or unsaturated cyclic radical free from sulfonic acid groups, Ar is a divalent radical free from sulfonic acid groups which combines with the

portion of the molecule to form an aromatic radical, and $n$ is one of the integers 1 and 2.

Examples of unsaturated cyclic radicals Z are those of benzene, diphenyl, naphthalene and anthraquinone. These radicals may contain, as substituents, halogen atoms such as chlorine or bromine atoms, alkyl radicals such as methyl groups, alkoxy radicals such as methoxy groups, nitro groups, acylamino groups such as benzoylamino groups or acetylamino groups, unsubstituted amide groups and amide groups substituted by phenyl radicals, the latter if desired containing halogen atoms, alkyl radicals or alkoxy radicals.

The aliphatic radicals Z may be derived for example from alkyl radicals having from one to six carbon atoms. They may contain substituents such as cyano groups, unsubstituted amide groups or amide groups substituted by phenyl radicals. Examples of suitable araliphatic radicals are benzoyl radicals.

If $n$ in formula I is 1, the following are suitable radicals —X—Z:

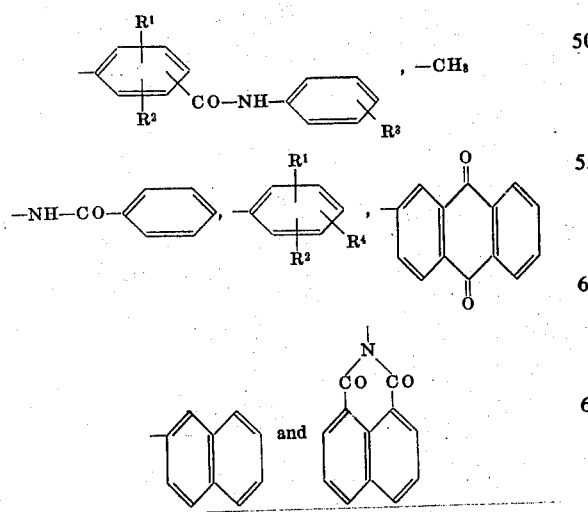

where $R^1$ is a hydrogen atom, a halogen atom such as chlorine or bromine atom, or a methoxy group, $R^2$ is a hydrogen atom, a halogen atom such as a chlorine or bromine atom, or a methoxy or nitro group, $R^3$ is a hydrogen atom, a halogen atom such as a chlorine or bromine atom, or a methoxy group, and $R^4$ is a hydrogen atom, a halogen atom such as a chlorine or bromine atom, or an amide, benzoyl, acetylamino or nitro group.

If $n$ in formula I is 2, the following are suitable radicals — X—Z—X—:

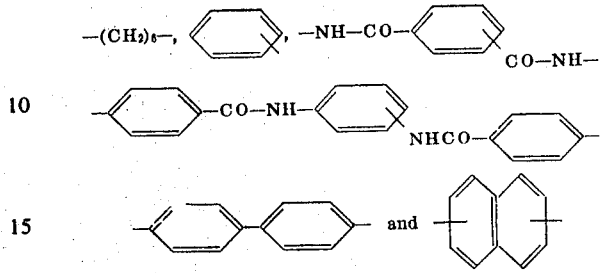

Suitable radicals Ar which combine with the

portion of the molecule to form an aromatic radical are those which together with

form a benzene or napthalene ring, the said ring if desired bearing substituents other than sulfonic acid groups. Examples of substituents are halogen atoms such as chlorine or bromine atoms, alkyl groups such as methyl or ethyl groups, alkoxy groups such as methoxy groups, or hydroxyl groups esterified with carboxylic acids, such as propionic acid. The radicals Ar include the following:

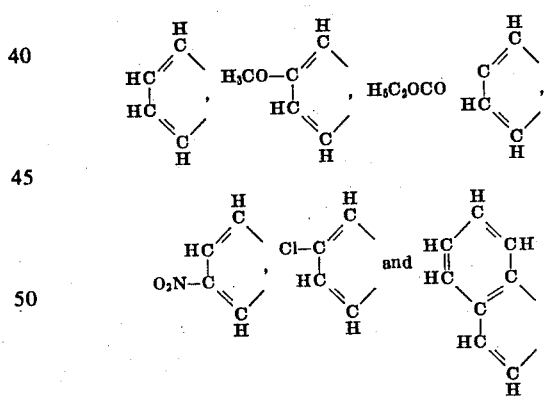

Of the dyes of formula I the dyes of formula I a:

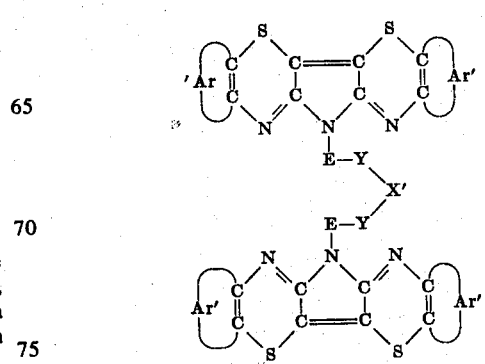

Ia are of particular industrial interest. In formula I a Ar' denotes one of the radicals

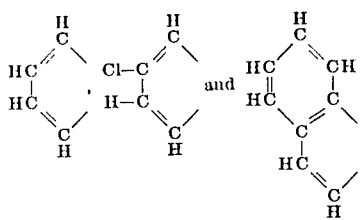

E one of the radicals

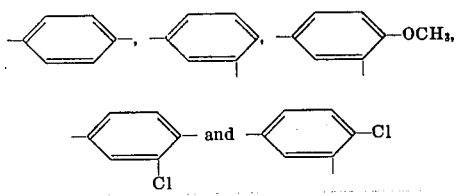

Y a —CO—NH— or —NH—CO— radical, and X' is a single bond or one of the radicals

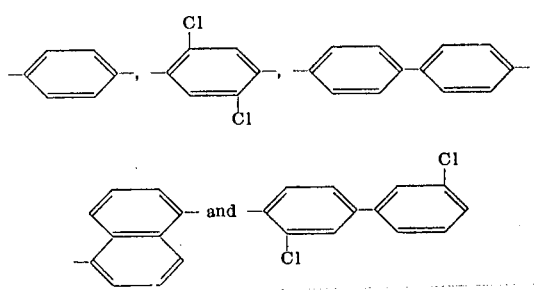

The new pigments may for example be prepared by condensing dichloromaleic acid or dichloromaleic anhydride with a compound having the general formula II: $(H_2N-X)_n-Z$ // (where X, Z and $n$ have the meanings given above) to form a compound of the general formula III:

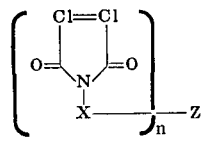
III (where X, Z and $n$ have the meanings given above) and reacting the resultant dichloromaleimide of formula III with an aromatic orthoaminomercapto compound of the general formula IV:

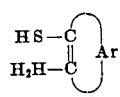
IV where Ar has the meanings given above, for example by heating in an organic solvent, advantageously at temperatures of from 80° to 180° C. Organic carboxylic acids such as acetic acid, propionic acid, butyric acid or mixtures containing the same are particularly suitable.

The pigment dyes may be isolated from the reaction mixtures for example by suction filtration, and if necessary they may be purified by heating in organic solvents. The color strength may be increased by bringing the dyes into a fine state of subdivision by conventional methods, for example by dissolution in and reprecipitation from, or swelling in, sulfuric acid, or by grinding in the presence of grinding aids. If necessary, the dyes may be formulated by dispersion in binders.

The dyes of formula I are suitable for all pigment applications, for example for the production of printing inks and nitrocellulose, acrylate, melamine or urea-formaldehyde based surface coatings, for mass coloring natural and synthetic macromolecular materials, e.g. polyethylene, polyvinyl chloride, polystyrene and rubber, for textile printing and for dope-dyeing.

Coloration of the materials or mixtures of materials is carried out in conventional manner. Yellow to red colorations are obtained, for example brilliant printing, inks and lacquers having high tinctorial strength, or mass colored plastics, which are distinguished by purity of shade, good fastness to overspraying and migration, high thermal stability and good fastness to light. Owing to their high thermal stability the pigments are particularly suitable for coloring synthetic thermoplastics.

The parts and percentages specified in the examples are by weight.

EXAMPLES

A. Production of the dichloromaleimides

An amino compound of the formula $(H_2N-X)_n-Z$ is added to 1,400 parts of glacial acetic acid in an amount (in parts) corresponding to the equivalent weight of the amine. Then 166 parts of dichloromaleic anhydride is added. The whole is heated for 1 hour at 60° C. and for 4 hours at 110° C., and the product is filtered cold, washed with a little methanol and dried. The dichloromaleimides listed in table I under $a$ are obtained in yields of 30 to 95 percent.

B. Production of the pigments

Table I

Dichloromaleimide (v. table I) is added to 5,000 parts of glacial acetic acid in an amount (in parts) corresponding to its molecular weight. Then 280 parts of o-aminomercaptobenzene is dripped in. The whole is stirred for 1 hour at 40° C., for another hour at 80° C., and for 6 hours at 110° C. The product is allowed to cool, washed with glacial acetic acid and methanol and dried. Pigments are obtained in the yields given in table I under $b$.

Table II

Dichloromaleimide as specified in the table is added to 600 parts of glacial acetic acid in an amount (in parts) corresponding to one tenth of its molecular weight. Then one of the aminomercapto compounds specified is added in an amount (in parts) corresponding to one quarter of its molecular weight. The mixture is stirred for 1 hour at 60° C., for another hour at 90° C., and for 6 hours at 110° C. The product is filtered cold, washed with glacial acetic acid and methanol and dried. The pigments are obtained in the yields given in table II.

(a) Dichloromaleimide

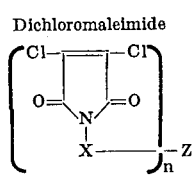

(b) Pigment

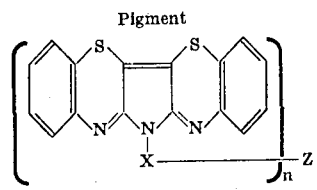

TABLE 1

| Number | $(-X)_n-Z$ (in a and b) | a Yield [Percent] | M.P. [°C.] | b Yield [Percent] | Shade |
|---|---|---|---|---|---|
| 1 | –C₆H₄–CONH–C₆H₅ | 85 | >200 | 75 | Reddish orange. |
| 2 | –C₆H₄–CONH–C₆H₄–Cl | 90 | >200 | 75 | Do. |
| 3 | –C₆H₄–CONH–C₆H₄–OCH₃ | 90 | >200 | 75 | Do. |
| 4 | –C₆H₄–CONH₂ | 85 | >200 | 80 | Do. |
| 5 | –C₆H₄–CONH– (meta) | 80 | 200 | 75 | Orange. |
| 6 | –C₆H₄–CONH–C₆H₄–OCH₃ (meta) | 80 | 200 | 75 | Do. |
| 7 | –C₆H₃(Cl)–CONH–C₆H₅ | 85 | 200 | 75 | Reddish orange. |
| 8 | –C₆H₃(OCH₃)–CONH–C₆H₅ | 85 | 200 | 80 | Do. |
| 9 | –C₆H₂(Cl)₂–CONH–C₆H₅ | 80 | >200 | 70 | Orange. |
| 10 | –C₆H₃(Cl)–CONH–C₆H₅ | 75 | >200 | 80 | Reddish orange. |
| 11 | –C₆H₄–NH–CO–C₆H₅ | 80 | >200 | 80 | Orange. |
| 12 | –C₆H₄–NH–CO–C₆H₅ (meta) | 80 | >200 | 75 | Do. |
| 13 | –C₆H₃(Cl)–Cl | 70 | 156 | 70 | Do. |
| 14 | –C₆H₄–Cl | 65 | 217 | 65 | Do. |
| 15 | –C₆H₄–OCH₃ | – | – | 60 | Do. |
| 16 | –C₆H₄–NO₂ | 40 | 149–151 | 65 | Reddish orange. |
| 17 | –C₆H₅ | 65 | 203 | 60 | Orange. |
| 18 | –C₆H₄–NO₂ | 55 | 198 | 55 | Do. |
| 19 | anthraquinonyl | 65 | 168 | 60 | Yellowish orange. |

| Number | $(-X)_n-Z$ (in a and b) | a Yield [Percent] | M.P. [°C.] | b Yield [Percent] | Shade |
|---|---|---|---|---|---|
| 20 | -C₆H₄-Cl | 45 | 130 | 65 | Orange. |
| 21 | -C₆H₄-OCH₃ | 65 | 133 | 65 | Do. |
| 22 | -naphthyl | 70 | 184 | 60 | Do. |
| 23 | -C₆H₄-NHCOCH₃ | 85 | >200 | 80 | Do. |
| 24 | -C₆H₅ | | | 70 | Do. |
| 25 | -C₆H₂(Cl)₃ (2,4,5-trichlorophenyl) | 70 | 168 | 75 | Do. |
| 26 | -C₆H₄-CH₃ | 75 | 201 | 65 | Do. |
| 27 | -C₆H₃(OCH₃)₂ | 40 | 127 | 55 | Do. |
| 28 | -CH₂-CO-NH-C₆H₅ | 45 | >200 | 60 | Do. |
| 29 | -(CH₂)₆- | 50 | 195 | 60 | Do. |
| 30 | -NH-CO-C₆H₄-CO-NH- | 85 | >200 | 75 | Do. |
| 31 | naphthalimido (-N(CO)₂-naphthyl) | 90 | >200 | 70 | Do. |
| 32 | tetrachlorophthalimido (-N(CO)₂-C₆Cl₄) | 90 | >200 | 70 | Do. |
| 33 | -NH-CO-CH₂-CN | 90 | >200 | 45 | Do. |
| 34 | -NH-C₆H₄-Cl | 70 | 171 | 50 | Red. |
| 35 | -CH₂-C₆H₅ | 45 | 102 | 45 | Orange. |
| 36 | -NH-C₆H₃(NO₂)₂ | 60 | >200 | 60 | Red. |
| 37 | -NH-CO-C₆H₅ | 70 | >200 | 40 | Do. |
| 38 | -C₆H₄-CONH-C₆H₄-NHCO-C₆H₄- | 90 | >200 | 95 | Orange. |
| 39 | -C₆H₃(Cl)-CONH-C₆H₄-NHCO-C₆H₃(Cl)- | 90 | >200 | 95 | Do. |

| Number | (−X)ₙ−Z (in a and b) | a Yield [Percent] | M.P. [°C.] | b Yield [Percent] | Shade |
|---|---|---|---|---|---|
| 40 | —C₆H₄—CONH—C₆H₃(Cl)₂—NHCO—C₆H₅ | 85 | >200 | 95 | Do. |
| 41 | —C₆H₄—CONH—C₆H₄—C₆H₄—NHCO—C₆H₅ | 90 | >200 | 95 | Do. |
| 42 | —C₆H₃(Cl)—CONH—C₆H₄—C₆H₄—NHCO—C₆H₅ | 85 | >200 | 90 | Do. |
| 43 | —C₆H₃(Cl)—CONH—C₆H₄—NHCO—C₆H₃(Cl)— | 90 | >200 | 95 | Do. |
| 44 | —C₆H₃(Cl)—CONH—C₆H₄—C₆H₄—NHCO—C₆H₃(Cl)— | 90 | >200 | 95 | Do. |
| 45 | —C₆H₃(Cl)—CONH—C₆H₃(Cl)—C₆H₃(Cl)—NHCO—C₆H₃(Cl)— | 90 | >200 | 95 | Do. |
| 46 | —C₆H₃(Cl)—CONH—naphthyl—NHCO—C₆H₃(Cl)— | 90 | >200 | 95 | Do. |
| 47 | —C₆H₄—NH—CO—C₆H₄—CO—NH—C₆H₄— | 70 | >200 | 74 | Do. |
| 48 | —C₆H₄—NH—CO—CO—NH—C₆H₄— | 64 | >200 | 82 | Do. |
| 49 | —C₆H₃(OCH₃)—NH—CO—C₆H₄—CO—NH—C₆H₃(OCH₃)— | 74 | >200 | 79 | Reddish orange. |

Dichloromaleimide 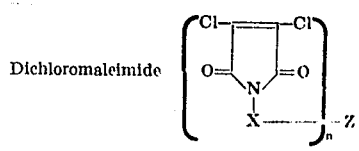

TABLE II

| Number | Aminomercapto compound used | $-(X)_n-Z$ | Yield | Shade |
|---|---|---|---|---|
| 1 | H₃CO–C₆H₃(SH)(NH₂) | –C₆H₄–Cl | 80 | Brown. |
| 2 | H₃CO–C₆H₃(SH)(NH₂) | –C₆H₅ | 70 | Orange brown. |
| 3 | H₃CO–C₆H₃(SH)(NH₂) | –C₆H₃Cl₂ (2,4-Cl) | 60 | Brown. |
| 4 | H₃CO–C₆H₃(SH)(NH₂) | –NH–C₆H₅ | 60 | Orange brown. |
| 5 | H₃CO–C₆H₃(SH)(NH₂) | –N(CH₃)₂ | 70 | Red. |
| 6 | 1-SH, 2-NH₂ naphthalene | –C₆H₅ | 50 | Do. |
| 7 | 1-SH, 2-NH₂ naphthalene | –naphthyl | 40 | Do. |
| 8 | 1-SH, 2-NH₂ naphthalene | –C₆H₄–Cl | 45 | Do. |
| 9 | C₂H₅OCO–C₆H₃(SH)(NH₂) | –C₆H₅ | 75 | Reddish orange. |
| 10 | C₂H₅OCO–C₆H₃(SH)(NH₂) | –C₆H₄–85 | 85 | Do. |
| 11 | C₂H₅OCO–C₆H₃(SH)(NH₂) | –C₆H₃Cl₂ | 70 | Red. |
| 12 | C₂H₅OCO–C₆H₃(SH)(NH₂) | –NH–C₆H₅ | 65 | Orange red. |
| 13 | C₂H₅OCO–C₆H₃(SH)(NH₂) | –NH–C₆H₄–Cl | 65 | Red. |

| Number | Aminomercapto compound used | —(X)ₙ—Z | Yield | Shade |
|---|---|---|---|---|
| 14 | C₂H₅OCO—⌬(SH)(NH₂) | —⌬—CONH—⌬ | 80 | Do. |
| 15 | NO₂—⌬(SH)(NH₂) | —⌬ | 55 | Brown. |
| 16 | Cl—⌬(SH)(NH₂) | —⌬ | 60 | Orange. |
| 17 | Cl—⌬(SH)(NH₂) | —⌬—CONH—⌬ | 80 | Red. |
| 18 | Cl—⌬(SH)(NH₂) | —⌬(Cl)—CO—NH—⌬—⌬—NH—CO—⌬(Cl)— | 76 | Orange. |
| 19 | naphthyl(SH)(NH₂) | —⌬—NH—CO—⌬(Cl,Cl)—NH—CO—⌬ | | Red. |

C. Use of the pigments

EXAMPLE 1

One part of the pigment designated No. 1 in table I is triturated on a three-roll mill with 10 parts of linseed oil varnish. The printing ink thus obtained gives orange prints having excellent brilliance and lightfastness when used in book printing. Similar results are obtained by using the other pigments listed in tables I and II.

Example 2

Ninety-five parts of a baking finish comprising 67 parts of coconut oil resin, 17 parts of urea-formaldehyde resin and 16 parts of ethylene glycol is triturated in suitable equipment with 8 parts of the pigment designated No. 1 in table I. The resultant reddish orange lacquer may be applied to metal sheet, cardboard or aluminum foil and gives reddish orange colorations having excellent fastness to overspraying and light after baking. Similar results are obtained by using the other pigments listed in tables I and II.

Example 3

A mixture of 70 parts of polyvinyl chloride, 30 parts of diisooctyl phthalate and one part of titanium dioxide is colored in conventional manner on rollers heated to 160° C., with 0.5 part of the pigment designated No. 1 in table I. A reddish orange PVC composition is obtained which may be used for example for the manufacture of sheet or profiles. The coloration is distinguished by high brilliance and good plasticizer and light fastness. Similar results are obtained by using the other pigments listed in tables I and II.

We claim:
1. A dye having the formula

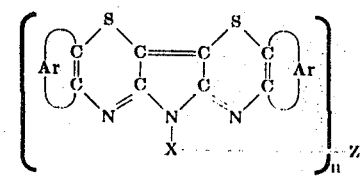

wherein Ar is a divalent radical combining with the —C=C— portion of the molecule to form an aromatic ring selected from the group consisting of benzene, naphthylene and benzene substituted by chlorine, bromine, methyl, ethyl, methoxy, nitro or —OCOC₂H₅, and n is one of the integers 1 and 2 such that:

A. when is the integer 1, the monovalent radical —X—Z is selected from the group consisting of

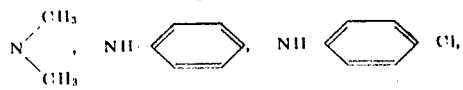

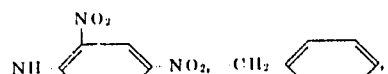

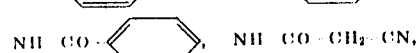

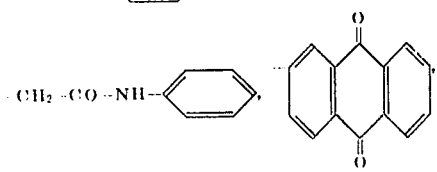

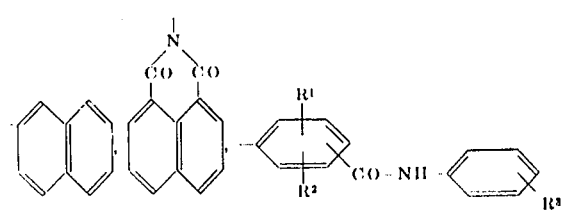

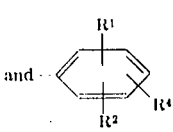

in which R¹ and R³ each represents hydrogen, chlorine, bromine or methoxy, R² represents hydrogen, chlorine or bromine and R⁴ represents hydrogen, chlorine, bromine, carbamyl, benzoylamino, acetylamino or nitro; B. when n is the integer 2, the divalent radical —X—Z—X— is selected from the group consisting of

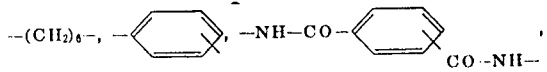

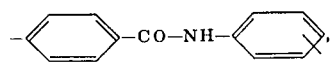

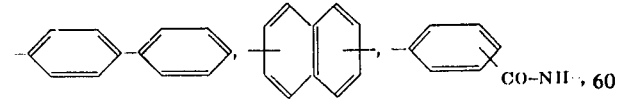

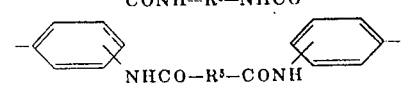

in which R⁵ is divalent phenyl, biphenyl or naphthyl and in which phenyl groups may be substituted by chlorine or methoxy.

2. A compound as claimed in claim 1 of the formula wherein Ar' denotes a radical selected from the group consisting of

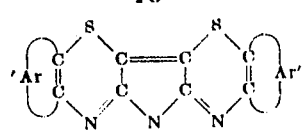

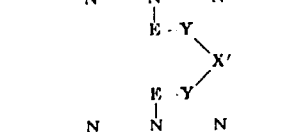

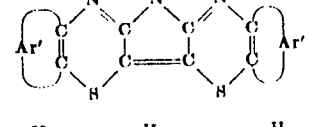

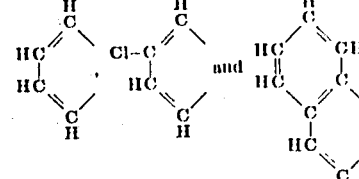

E denotes a radical selected from the group consisting of

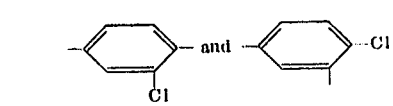

Y denotes a radical selected from the group consisting of —CO—NH— and —NH—CO—, and X' denotes a single bond or a radical selected from the group consisting of

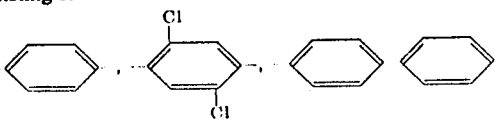

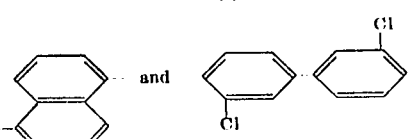

3. The dye having the formula

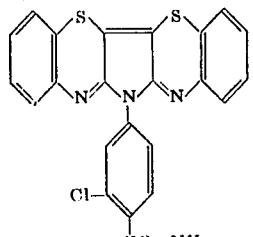
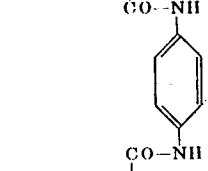
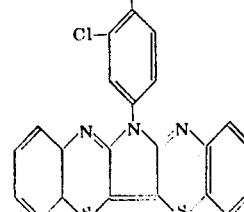

PO-1050
(5/69)

UNITED STATES PATENT OFFICE
CERTIFICATE OF CORRECTION

Patent No. 3,624,080          Dated November 30, 1971

Inventor(s) Peter Dimroth and Manfred Gaeng

It is certified that error appears in the above-identified patent and that said Letters Patent are hereby corrected as shown below:

Column 3, line 43, "$(H_2N-X)_n-Z$" should read -- $(H_2N-X)_n-Z$   II --.

Column 15, lines 57 to 59, claim 1, "  "

should read --  --.

3,624,080

(2)

Column 15, line 72, to column 16, line 15, claim 2,
" 2. A compound as claimed in claim 1 of the formula wherein Ar' denotes a radical selected from the group consisting of

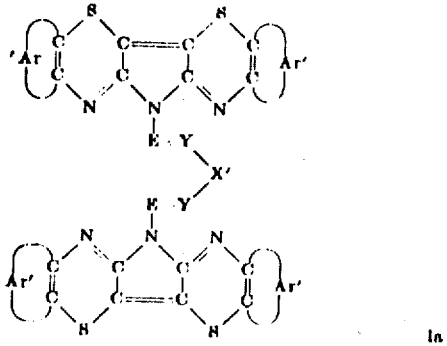

should read -- 2. A compound as claimed in claim 1 of the formula

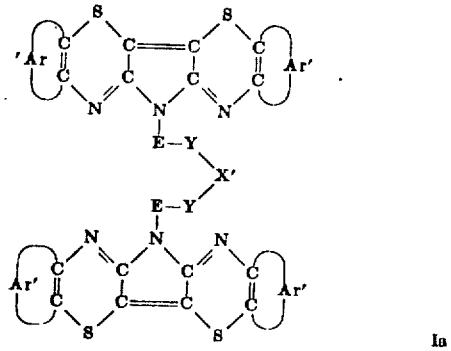

wherein Ar' denotes a radical selected from the group consisting of

Signed and sealed this 9th day of May 1972.

(SEAL)
Attest:

EDWARD M. FLETCHER, JR.
Attesting Officer

ROBERT GOTTSCHALK
Commissioner of Patents